United States Patent
Vizer et al.

(10) Patent No.: US 11,485,405 B2
(45) Date of Patent: Nov. 1, 2022

(54) METHOD FOR CONTROLLING A STEER-BY-WIRE STEERING SYSTEM COMPRISING A LIMITER FOR REACHING A SAFETY LEVEL

(71) Applicants: thyssenkrupp Presta AG, Eschen (LI); thyssenkrupp AG, Essen (DE)

(72) Inventors: Daniel Vizer, Csabdi (HU); Peter Kakas, Budapest (HU)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 79 days.

(21) Appl. No.: 17/040,097

(22) PCT Filed: Apr. 12, 2019

(86) PCT No.: PCT/EP2019/059509
§ 371 (c)(1),
(2) Date: Sep. 22, 2020

(87) PCT Pub. No.: WO2019/201792
PCT Pub. Date: Oct. 24, 2019

(65) Prior Publication Data
US 2021/0024123 A1 Jan. 28, 2021

(30) Foreign Application Priority Data

Apr. 17, 2018 (DE) ..................... 10 2018 109 084.6

(51) Int. Cl.
*B62D 6/00* (2006.01)
*B62D 5/00* (2006.01)

(52) U.S. Cl.
CPC .................................. *B62D 5/006* (2013.01)

(58) Field of Classification Search
CPC ........... B62D 5/006; B62D 6/008; B62D 6/00
(Continued)

(56) References Cited

U.S. PATENT DOCUMENTS 6,763,908 B2 * 7/2004 Ogawa ................... B62D 5/008
180/443
2009/0271070 A1 * 10/2009 Feller ..................... B62D 6/008
701/41

(Continued)

FOREIGN PATENT DOCUMENTS

CN 102985310 A 3/2013
DE 199 12 169 A 7/2000
(Continued)

OTHER PUBLICATIONS

English Translation of International Search Report issued in PCT/EP2019/059509, dated Sep. 9, 2019.

*Primary Examiner* — Shardul D Patel
(74) *Attorney, Agent, or Firm* — thyssenkrupp North America, LLC

(57) ABSTRACT

A method for controlling a steer-by-wire steering system for motor vehicles includes a steering actuator that acts on the steered wheels and is electronically controlled in accordance with a steering request. A feedback actuator transmits reactions of the road to a steering wheel. A control unit controls the feedback actuator. The method includes determining a basic motor torque; providing at least one steering function which is part of a first subgroup of steering functions; limiting the output value of the at least one steering function to reach a predefined safety level in a first limiter; adapting the basic motor torque by means of the limited output value of the at least one steering function in a summing element; and actuating the feedback actuator with the resulting motor torque which is output by the summing element.

9 Claims, 2 Drawing Sheets

(58) Field of Classification Search
USPC .......................................................... 701/41
See application file for complete search history.

(56) References Cited

U.S. PATENT DOCUMENTS

| | | | |
|---|---|---|---|
| 2010/0211264 A1* | 8/2010 | Wey .................... | B62D 6/00 |
| | | | 701/41 |
| 2013/0110352 A1 | 5/2013 | Doi et al. | |
| 2014/0121904 A1* | 5/2014 | Dornhege .............. | B62D 6/008 |
| | | | 701/42 |
| 2015/0210318 A1* | 7/2015 | Takeda .................. | B62D 6/008 |
| | | | 701/41 |
| 2015/0225015 A1* | 8/2015 | Takeda .................. | B62D 6/008 |
| | | | 701/41 |
| 2016/0052543 A1* | 2/2016 | Weinreich ............ | B62D 5/0481 |
| | | | 701/41 |
| 2018/0015945 A1 | 1/2018 | Saucier et al. | |

FOREIGN PATENT DOCUMENTS

| | | |
|---|---|---|
| DE | 103 25 587 A | 1/2004 |
| EP | 2 905 203 A | 8/2015 |
| EP | 2 905 205 A | 8/2015 |
| EP | 2 905 207 A | 8/2015 |

\* cited by examiner

METHOD FOR CONTROLLING A STEER-BY-WIRE STEERING SYSTEM COMPRISING A LIMITER FOR REACHING A SAFETY LEVEL

CROSS REFERENCE TO RELATED APPLICATIONS

This application is a U.S. National Stage Entry of International Patent Application Serial Number PCT/EP2019/059509, filed Apr. 12, 2019, which claims priority to German Patent Application No. DE 10 2018 109 084.6, filed Apr. 17, 2018, the entire contents of both of which are incorporated herein by reference.

FIELD

The present disclosure generally relates to a method for controlling a steer-by-wire steering system.

BACKGROUND

In steer-by-wire steering systems, the position of the steered wheels is not coupled directly to the steering input means, for example a steering wheel. There is a connection between the steering wheel and the steered wheels using electrical signals. The driver's steering request is tapped by a steering angle sensor and control of the position of the steered wheels is carried out in accordance with the driver's steering request, using a steering actuator. A mechanical connection to the wheels is not provided so that after the steering wheel has been activated no direct force feedback is provided to the driver. However correspondingly adapted feedback, for example during parking or during straight-ahead travel, during which a steering torque which is adapted to the reaction of the vehicle and is different depending on the vehicle manufacturer is desired as force feedback is provided. When cornering occurs, reaction forces act as transverse forces on the steering gear, which the feedback actuator models in the form of a torque which is opposed to the steering direction. The driver experiences a steering sensation which can be predefined as a result. In order to simulate the reactions on the road of the steering wheel during steer-by-wire steering operations, it is necessary to provide a feedback actuator (FBA) on the steering wheel or the steering column, which feedback actuator (FBA) impresses a steering sensation on the steering handle in accordance with the desired reactions. The provision of said steering sensation is critical to the safety of a reliable and safe control of the vehicle.

Thus, a need exists for an improved method for safely providing a steering sensation of a feedback actuator for a steer-by-wire steering system of a motor vehicle.

DETAILED DESCRIPTION

Figure 1:
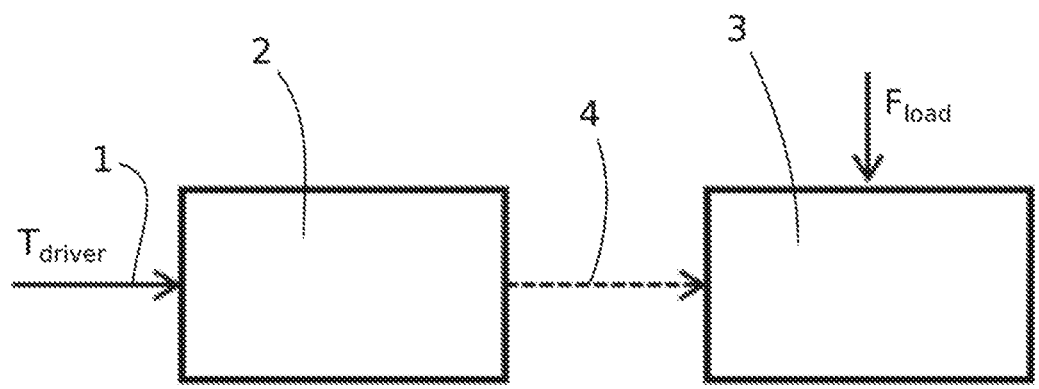
FIG. 1 is a block diagram of a control process of a steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a method for controlling a steer-by-wire steering system and to a steer-by-wire steering system.

Accordingly, a method is provided for controlling a steer-by-wire steering system for motor vehicles, comprising a steering actuator which acts on the steered wheels and is electronically controlled in accordance with a driver's steering request, a feedback actuator which transmits reactions of the road to a steering wheel, and a control unit which controls the feedback actuator, wherein the method comprises the following method steps for calculating a motor torque:

- determining a basic motor torque which is dependent on the driving state and on the position;
- providing at least one steering function which is part of a first subgroup of steering functions;
- limiting the output value of the at least one steering function to reach a predefined safety level in a first limiter;
- adaptation of the basic motor torque by means of the limited output value of the at least one steering function in a summing element;
- actuating the feedback actuator with the resulting motor torque which is output by the summing element.

This method can in some way ensure that the values which are calculated by the at least one steering function result in a safe motor torque or resetting torque. The term "safe" is understood in this case to mean that the feedback actuator does not become locked or perform an undesired movement of the steering handle within the scope of a self-steering process.

The at least one steering function preferably has a steering function for providing damping of the steering, a steering hysteresis and/or for resetting the steering wheel to the center. These steering functions form a steering sensation of a conventional electromechanical steering system.

It is advantageous if the first limiter limits the output value of the at least one steering function in accordance with at least one parameter selected from the group comprising a vehicle speed, an angular speed of the motor of the feedback actuator, a torque, applied by the driver, at the steering wheel, and a steering wheel steering angle. For this purpose, the limiter has preferably stored a maximum permissible motor torque for each value of the relevant parameter.

However, there can also be provision that the limiter limits the output value of the at least one steering function to a limited basic motor torque, wherein the limited basic motor torque is calculated by applying an upper limiting value and a lower limiting value to the basic motor torque. In this case, the upper and lower limiting values are preferably calculated as a function of the vehicle speed.

In the event of at least two steering functions whose output values do not have the required safety level being provided, these values are combined in a first summing element before they are limited in the first limiter.

It is also possible to provide a second subgroup of steering functions with at least one steering function whose output value is input into the summing element for the adaptation of the basic motor torque. If this steering function determines output values with an excessively low safety level, a further limiter can be provided.

The object is also achieved by a steer-by-wire steering system for motor vehicles, comprising a steering actuator which acts on the steered wheels and is electronically controlled in accordance with a driver's steering request, a feedback actuator which transmits reactions at the road to a steering wheel, and a control unit which controls the feedback actuator, wherein the control unit is configured to execute the method described above.

FIG. 1 shows a block diagram of a steer-by-wire steering system. A rotational angle sensor which is mounted on a steering shaft senses the driver steering torque $T_{driver}$ which is applied by rotating a steering wheel. The driver steering torque $T_{driver}$ is transferred via a signal line 1 to a feedback actuator 2 which serves to transmit the reactions from the roadway to the steering wheel and/or to represent a steering effort and therefore to provide the driver with feedback about the steering behavior and driving behavior of the vehicle. The feedback actuator 2 actuates an electric steering actuator 3 in accordance with the signal of the rotational angle sensor as well as further input variables, such as e.g. the vehicle speed, yaw rate and the like, via a signal line 4, which steering actuator 3 controls the position of the steered wheels. The steering actuator 3 acts indirectly on the steered wheels via steering-rack steering gear and track rods as well as other components. The feedback properties of the steering system are conventionally determined by means of the steering rack force $F_{load}$, which acts on the steering rack from the track rods which are connected to the wheels via the chassis. The steering rack force $F_{load}$ is decisively influenced by the current lateral guidance forces. Therefore, a significant part of the current steering rack force $F_{load}$ corresponds to a lateral acceleration. The steering rack force $F_{load}$ is, however, not only determined by the lateral forces occurring while a bend is being driven through but a multiplicity of further variables of a current driving situation influence the steering rack force $F_{load}$. An example of this is the condition of the roadway (unevenness, rots, coefficient of friction).

Figure 2:
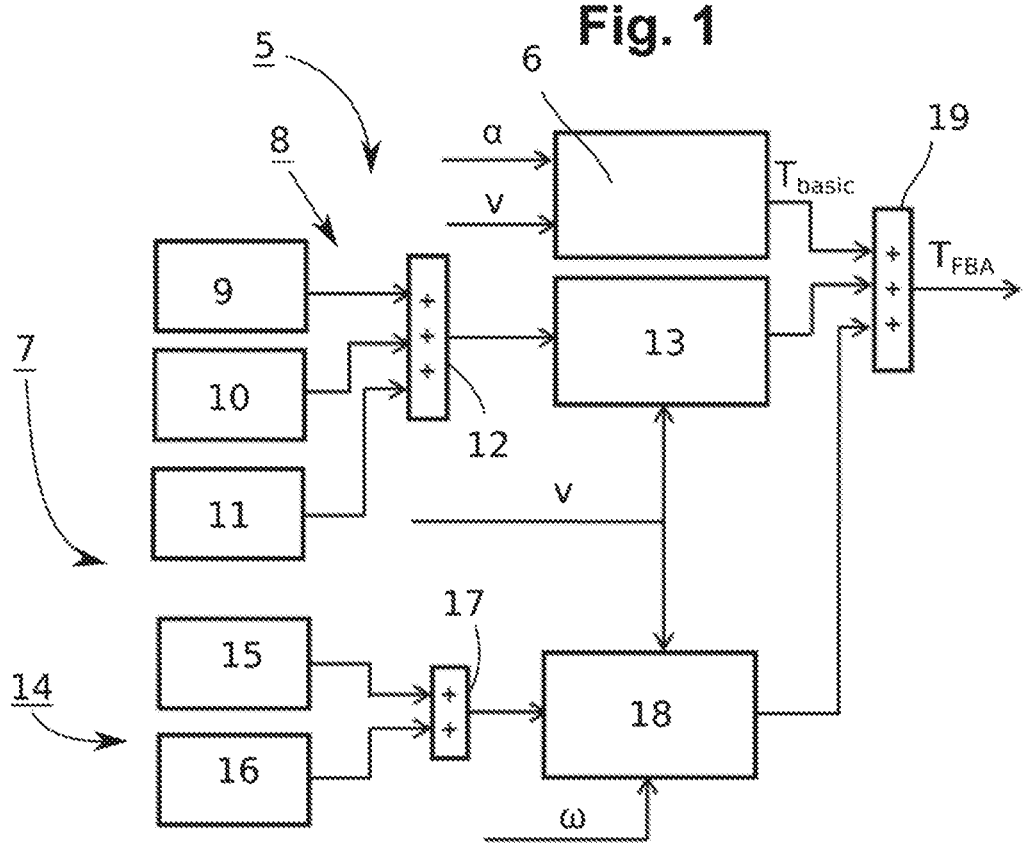
FIG. 2 is a block diagram of a calculation of a motor torque for actuating a feedback actuator.

As illustrated in FIG. 2, a control unit 5 calculates a motor torque $T_{FBA}$ which is required to provide a steering sensation. The motor torque $T_{FBA}$ results in a resetting torque which is present at the steering wheel and which counteracts a steering sensation which is applied by the driver.

A multiplicity of steering functions are used in this context. The calculation of the motor torque $T_{FBA}$ is essentially divided into two main parts. In a first part 6, a basic motor torque $T_{basic}$ is determined on the basis of the rotational angle α and the vehicle speed v. Further variables such as, for example, the steering angle and the lateral acceleration of the vehicle can be included in the calculation. The basic curve which is provided for this purpose and is dependent on the steering speed and vehicle speed always supplies a safe basic motor torque $T_{basic}$, which brings about a basic steering sensation at the steering wheel.

In a second part 7, a multiplicity of steering functions are used to adapt the basic steering sensation. In order to give the driver the sensation of conventional steering in a steer-by-wire steering system, in a first subgroup 8 a steering function for providing damping 9 of a steering system is provided, which steering function damps violent or abrupt steering reactions and steering movements. In addition, the first subgroup 8 preferably comprises a steering function 10 which provides a steering hysteresis (steering torque-steering angle) which determines the steering friction. In the first subgroup 8, further steering functions 11 can be provided, for example a function for resetting the steering wheel to the center and the like. The output values of the steering functions of the first subgroup 8 are fed to a first summing element 12. Since the output values do not have the required safety level, the output signal of the first summing element 12 is limited in a first limiter 13 in order to reach the required safety level. The first limiter 13 can limit here the output signal of the first summing element 12 in accordance with the following parameters: the vehicle speed, the angular speed of the motor, the torque applied by the driver at the steering wheel and/or the steering wheel angle. A limitation process in accordance with the vehicle speed v is illustrated here. The first limiter 13 therefore ensures that the motor torque which is applied by the first summing element 12 is within a permissible range, and an uncontrollable motor torque request is not passed on to the feedback actuator. For this purpose, the first limiter 13 has the maximum permissible motor torque for the corresponding values of the previously listed parameters. A vehicle-speed-dependent motor torque limitation is provided. The values may be measured values or estimated values which have the required safety level. The maximum permissible motor torque is defined at the steering wheel by means of the maximum permissible resetting torque of the feedback actuator.

Furthermore, a second subgroup 14, which contains the damping functions and the limiter, is provided with steering functions 15, 16 whose output values are combined in a second summing element 17 and limited by a second limiter 18. This second limiter 18 performs limitation in accordance with the vehicle speed v and the angular speed of the motor co.

A third summing element 19 combines the basic motor torque $T_{basic}$ with the first output motor torque of the first limiter 13 and the second output motor torque of the second limiter 18. It is also possible to provide further steering functions which already satisfy the required safety level and are also input into the third summing element 19. The output signal of the third summing element 19 is the resulting motor torque $T_{FBA}$ which is used to actuate the feedback actuator.

Figure 3:
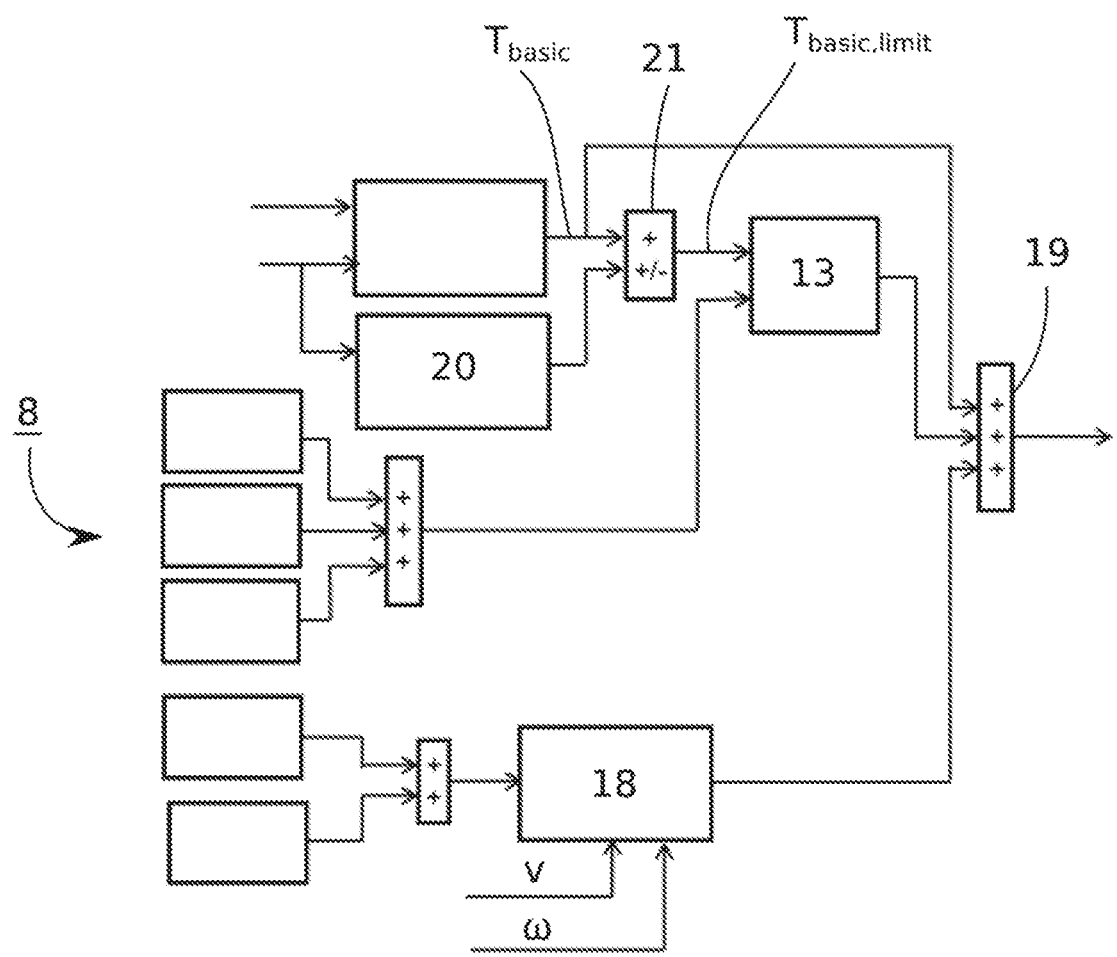
FIG. 3 is a block diagram of a second calculation of a motor torque for actuating a feedback actuator.

FIG. 3 shows a second embodiment of the invention in which, in contrast to the embodiment in FIG. 2 described above, a limiting value calculation with an upper limiting value and a lower limiting value takes place. The calculation of the limiting value is carried out here in accordance with the vehicle speed v in a limiting value calculation unit 20. In a computing unit 21, the basic motor torque $T_{basic}$ is limited to the calculated limiting values. The limited basic motor torque $T_{basic,limit}$ is passed onto the first limiter 13, so that the latter limits the signal of the first subgroup 8 to the limited basic motor torque $T_{basic,limit}$. The output values of the first limiter 13 and of the second limiter 18 and the originally calculated basic motor torque $T_{basic}$ are then input into the third summing element 19. It can therefore be ensured that the resulting motor torque which is used to actuate the motor has the required safety level.

What is claimed is:

1. A method for controlling a steer-by-wire steering system for motor vehicles, the steering system comprising a steering actuator which acts on steered wheels of the motor vehicle and is electronically controlled in accordance with a steering request, a feedback actuator which transmits reactions of the road to a steering wheel, and a control unit which controls the feedback actuator, the method for calculating a motor torque of the steering system comprising:

- determining a basic motor torque which is dependent on a driving state and on a position;
- providing at least one steering function which is part of a first subgroup of steering functions;
- limiting an output value of the at least one steering function to reach a predefined safety level in a first limiter;
- adapting the basic motor torque by means of the limited output value of the at least one steering function in a summing element; and
- actuating the feedback actuator with a resulting motor torque which is output by the summing element.

2. The method of claim 1 wherein the at least one steering function has a steering function configured to provide damping of the steering, a steering hysteresis, and/or configured to reset the steering wheel to center.

3. The method of claim 1 wherein the first limiter limits the output value of the at least one steering function in accordance with at least one parameter selected from the group comprising a vehicle speed, an angular speed of the motor of the feedback actuator, a torque applied at the steering wheel, and a steering wheel steering angle.

4. The method of claim 3 wherein the first limiter has a maximum permissible motor torque for each value of the relevant parameter.

5. The method of claim 1 wherein the first limiter limits the output value of the at least one steering function to a limited basic motor torque, wherein the limited basic motor torque is calculated by applying an upper limiting value and a lower limiting value to the basic motor torque.

6. The method of claim 5 wherein the upper and lower limiting values are calculated as a function of the vehicle speed.

7. The method of claim 1 wherein at least two steering functions are provided, the output values of which are combined in a first summing element before the output value of the first summing element is limited in the first limiter.

8. The method of claim 1 wherein a second subgroup of steering functions is provided with at least one steering function whose output value is input into the summing element for the adaptation of the basic motor torque.

9. A steer-by-wire steering system for motor vehicles, comprising a steering actuator which acts on steered wheels of the motor vehicle, and is electronically controlled in accordance with a steering request, a feedback actuator which transmits reactions at the road to a steering wheel, and a control unit which controls the feedback actuator, wherein the control unit is configured to execute a method comprising:

- determining a basic motor torque which is dependent on a driving state and on a position;
- providing at least one steering function which is part of a first subgroup of steering functions;
- limiting an output value of the at least one steering function to reach a predefined safety level in a first limiter;
- adapting the basic motor torque by means of the limited output value of the at least one steering function in a summing element; and
- actuating the feedback actuator with a resulting motor torque which is output by the summing element.

* * * * *